(12) United States Patent
Koskey

(10) Patent No.: US 10,279,663 B2
(45) Date of Patent: May 7, 2019

(54) DOOR PROTECTION DEVICE AND METHOD

(71) Applicant: James Donald Koskey, Manitou Springs, CO (US)

(72) Inventor: James Donald Koskey, Manitou Springs, CO (US)

(73) Assignee: K&H Manufacturing, Inc., Phoenix, AZ (US)

( * ) Notice: Subject to any disclaimer, the term of this patent is extended or adjusted under 35 U.S.C. 154(b) by 44 days.

(21) Appl. No.: 14/546,566

(22) Filed: Nov. 18, 2014

(65) Prior Publication Data

US 2018/0093554 A1   Apr. 5, 2018

(51) Int. Cl.
*B60J 5/04* (2006.01)

(52) U.S. Cl.
CPC .................................. *B60J 5/0493* (2013.01)

(58) Field of Classification Search
CPC .................................. B60J 5/0493; B60J 11/06
See application file for complete search history.

(56) References Cited

U.S. PATENT DOCUMENTS

| 4,950,023 A * | 8/1990 | Waller | B60N 2/783 296/153 |
| 5,833,194 A * | 11/1998 | Jones | B60N 3/103 248/311.2 |

* cited by examiner

*Primary Examiner* — D Glenn Dayoan
*Assistant Examiner* — Melissa A Black
(74) *Attorney, Agent, or Firm* — Ice Miller LLP

(57) ABSTRACT

A door protection device has a number of stay tabs attached along an edge of a protective layer or pad. Each of the stay tabs has a sharped end or wedge shaped end that is inserted between the window and the weather stripping. Each of the stay tabs also has one or more ribs that face away from the window when inserted. At one end of the protective pad a suction cup is attached. The protective layer may be a heavy fabric or a pad that may include a silicone rubber layer or an ethylene-vinyl acetate layer or a foamed plastic layer.

8 Claims, 5 Drawing Sheets

DOOR PROTECTION DEVICE AND METHOD

BACKGROUND OF THE INVENTION

People use their vehicles to transport pets, such as cats and dogs. These pets have sharp nails that can damage the interior of cars, thus reducing their resale value and esthetic appearance. Dogs in particular like to look out windows and scratch the inside door panel when they jump up on the door panel to look out the window. There have been a number of attempts to solve this problem. One solution uses permanent attachment points to hold a pad over the door. Unfortunately, this results in marring the interior door panel also. Some solutions use plastic suction cups or other non-permanent adhesive systems to hold a pad over the inside door panel. The problem with these solutions is that they tend to fall off when the dog jumps on the pad. Another group of solutions uses a semi-rigid tab inserted between the window and the inside weather stripping that extends into the interior of the door. This solves the problem of the pad falling down. However, one problem with these solutions is that the protection device falls out when the window is rolled down and then rolled up causing the owner to constantly reinsert the protection device. It is often difficult to insert the semi-rigid tab between the weather stripping and the window. Another problem with some of these solutions is that the tabs interfere with the mechanical functions of the door. Another problem is that some doors have a part that is not concurrent with the window, which causes the pad to fold over and leaves that part of the door unprotected.

Thus there exists a need for a door protection system that does not have to be reinstalled every time the window is rolled up and down, is easy to install, protects the whole interior door panel, does not interfere with the mechanical function of the door, and fits most car door sizes and styles.

BRIEF SUMMARY OF INVENTION

A door protection system that overcomes these and other problems has a number of stay tabs attached along an edge of a protective layer or pad. Each of the stay tabs has a sharped end or wedge shaped end that is inserted between the window and the weather stripping. Each of the stay tabs also has one or more ribs that face away from the window when inserted. At one end of the protective layer a suction cup is attached. The protective layer may be a heavy fabric or a pad that may include a silicone rubber layer or an ethylene-vinyl acetate layer or a foamed plastic layer.

The use of multiple stay tabs ensure that the tabs are not too long as to interfere with the mechanical functions of the door or window. The sharpened or wedge shaped entrance are of the stay tabs makes them easy to insert. The ribs engage a lower lip of the weather stripping and ensure the door protection device does not fall out when the owner lowers and raises the window. The suction cup allows the door protection device to function with car doors that have an interior panel that is not concurrent with the door. Finally, the plurality of tabs allow the pad to be bunched up for shorter doors and spread out for longer doors allowing it to work almost any car door.

DETAILED DESCRIPTION OF THE INVENTION

The invention is direct to a door protection system that has a number of stay tabs attached along an edge of a protective layer or pad. Each of the stay tabs has a sharped end or wedge shaped end that is inserted between the window and the weather stripping. Each of the stay tabs also has one or more ribs that face away from the window when inserted. At one end of the protective layer a suction cup is attached. The protective layer may be a heavy fabric or a pad that may include a silicone rubber layer or an ethylene-vinyl acetate layer or a foamed plastic layer.

The plurality of stay tabs ensure that the tabs are not too long as to interfere with the mechanical functions of the door or window. The sharpened or wedge shaped entrance are of the stay tabs makes them easy to insert. The ribs engage a lower lip of the weather stripping and ensure the door protection device does not fall out when the owner lowers and raises the window. The suction cup allows the door protection device to function with car doors that have an interior panel that is not concurrent with the door. Finally, the plurality of tabs allow the pad to be bunched up for shorter doors and spread out for longer doors allowing it to work almost any car door.

Figure 1:
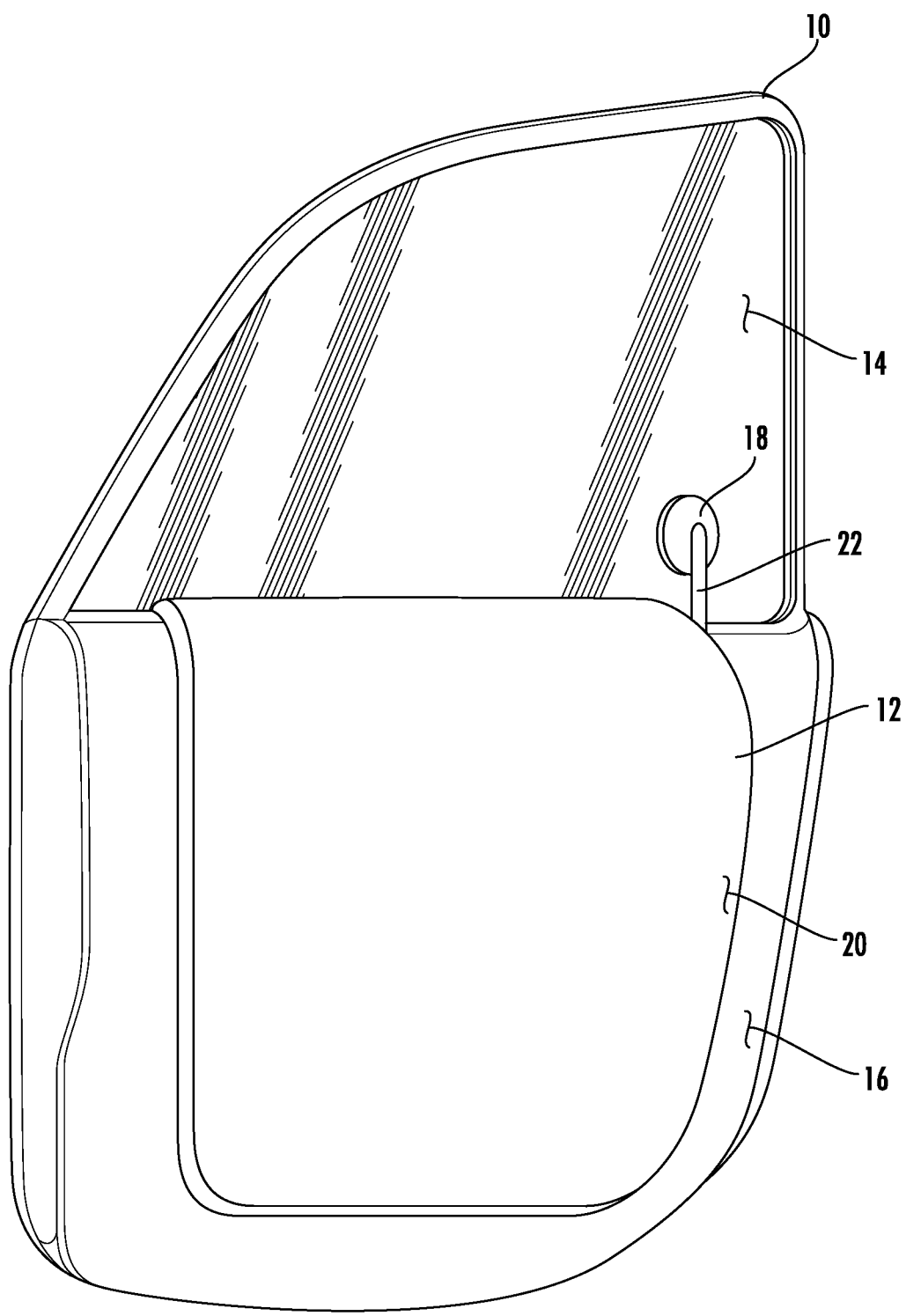
FIG. 1 is a perspective view of a car door with the door protection device installed in accordance with one embodiment of the invention.

FIG. 1 is a perspective view of a car door 10 with the door protection device 12 installed in accordance with one embodiment of the invention. The car door 10 has a window 14 and the door protection device 12 drapes from the bottom of the window 14 over the interior door panel 16. A suction cup 18 is attached to window 14 and protective pad or layer 20 by a tether 22. The suction cup 18 is not used for the style of car door shown in FIG. 1, but for the style of door 24 shown in FIG. 4. With this style of door the tether 22 may be cut by the owner and removed.

Figure 2:
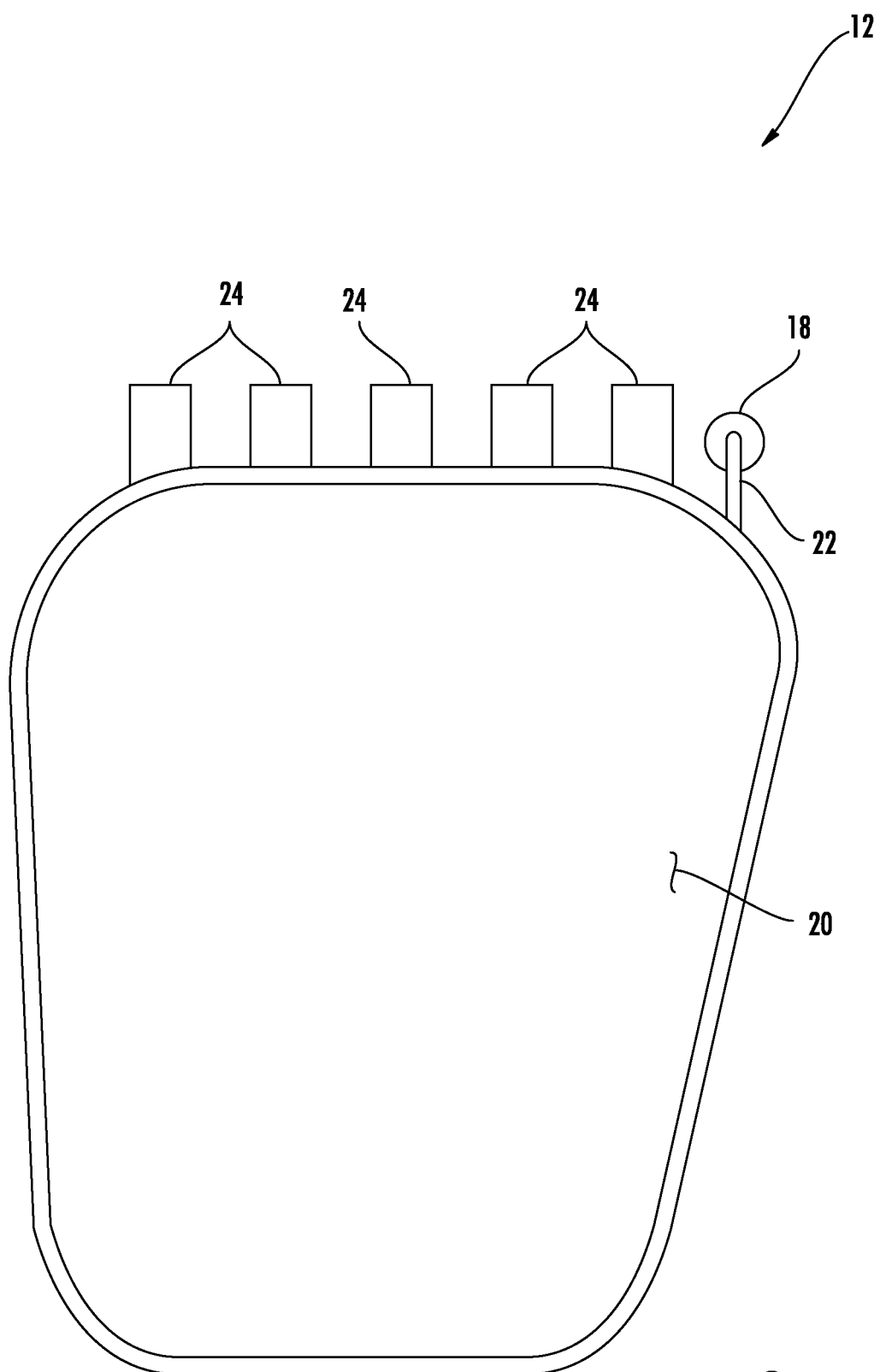
FIG. 2 is a side view of the door protection device in accordance with one embodiment of the invention.

FIG. 2 is a side view of the door protection device 12 in accordance with one embodiment of the invention. The door protection device has a protection pad or layer 12 that is attached to a plurality of stay tabs 24 along one edge of the pad 12. A tether 22 and suction cup 18 is at one end of the edge of the pad 12. In another embodiment, a second tether and suction cup is at the other end. The stay tabs 24 can be sewn to the protective pad 12, or welded to the pad or attached with by any suitable method. The stay tabs 24 are made of a semi-rigid plastic or similar material. The stay tabs are inserted between the window and the weather stripping as show in FIG. 3.

Figure 3:
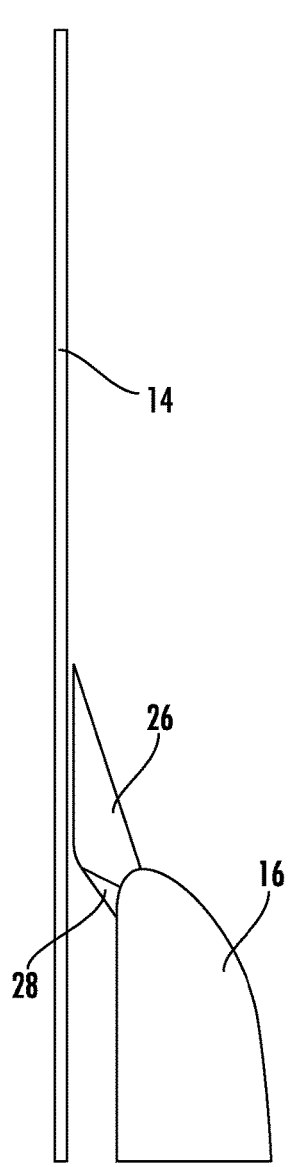
FIG. 3 is a cross sectional view of a car window, weather stripping and interior panel in accordance with one embodiment of the invention.

FIG. 3 is a cross sectional view of a car window 14, weather stripping 26 and interior panel 16 in accordance with one embodiment of the invention. The weather stripping 26 is usually a rubber wedge that runs along the edge of the window 14 and the interior panel 16. The weather stripping 26 has a lip or ledge 28 that engages the ribs of the stay tabs (shown in FIG. 5).

Figure 4:
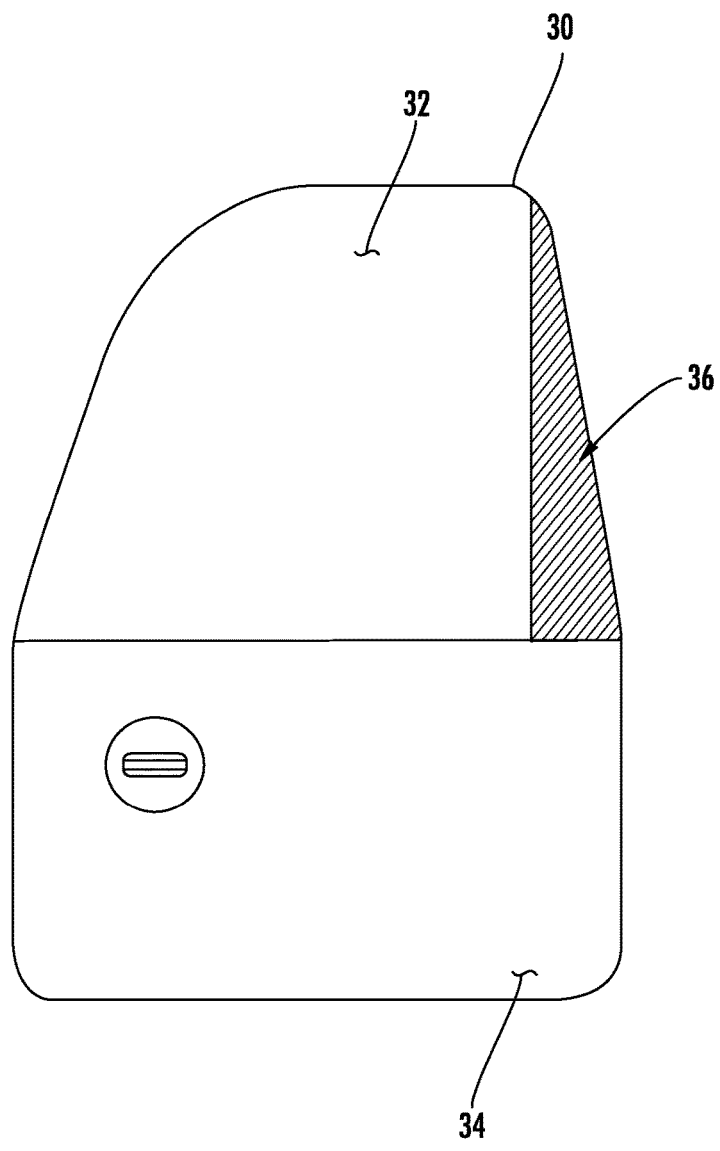
FIG. 4 is a front view of an alternative car door that works with the present invention.

FIG. 4 is a front view of an alternative car door 30 that works with the present invention. This door 30 has a window 32 that is not completely concurrent with the interior door panel 34. One section 36 is not a window, but usually a solid plastic panel. As a result, the stay tabs 24 cannot be inserted in this section 36, so the tether 22 and suction cup 18 are used to hold up this edge of the pad 20.

Figure 5:
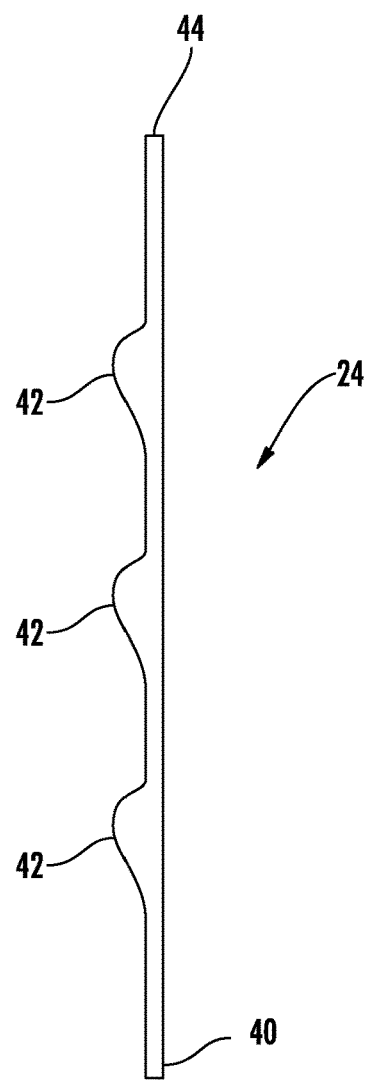
FIG. 5 is a side view of a stay tab in accordance with one embodiment of the invention.

FIG. 5 is a side view of a stay tab 24 in accordance with one embodiment of the invention. The stay tab 24 has an entrance or insertion end 40, which is wedge shaped or sharpened. It also has a number of ribs 42 which run parallel to the attachment edge 44 that attaches to the edge of the protective pad 20. The ribs are asymmetrical along their longitudinal axis, which is into and out of the paper in this view. This asymmetry increases the friction between the lip 28 of the weather stripping 26 (See FIG. 3).

Figure 6:
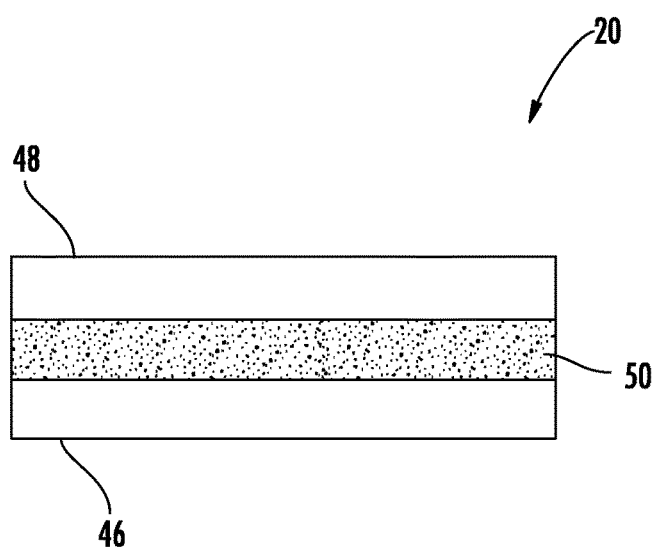
FIG. 6 is a cross sectional view of a protection pad in accordance with one embodiment of the invention.

FIG. 6 is a cross sectional view of a protection pad 20 in accordance with one embodiment of the invention. The protection pad 20 is layered with a couple of exterior cloth layers 46, 48 that sandwich an impact layer 50. The impact layer may be a foamed plastic, or an ethylene-vinyl acetate, or silicone rubber. In one embodiment, the protection pad 20 is just a heavy cloth.

Figure 7:
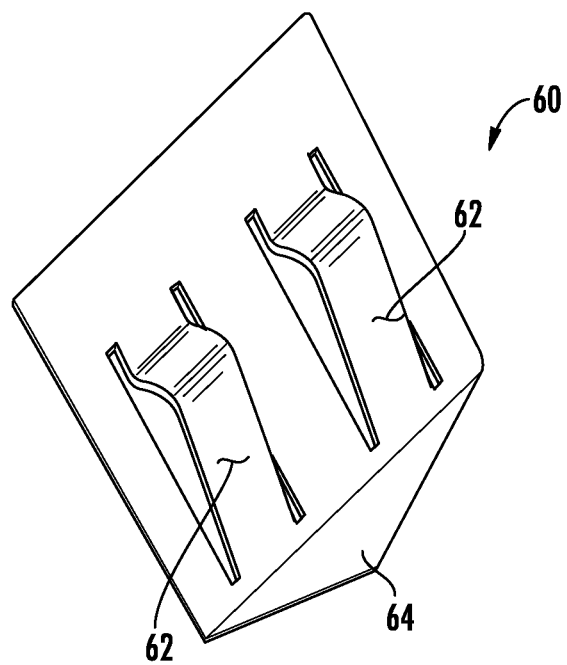
FIG. 7 is perspective view of a stay tab in accordance with one embodiment of the invention.

FIG. 7 is perspective view of a stay tab 60 in accordance with one embodiment of the invention. In this embodiment of the stay tab 60 the ribs 62 are plastic springs. Note the stay tab 60 has a V-shaped entrance side 64.

Figure 8:
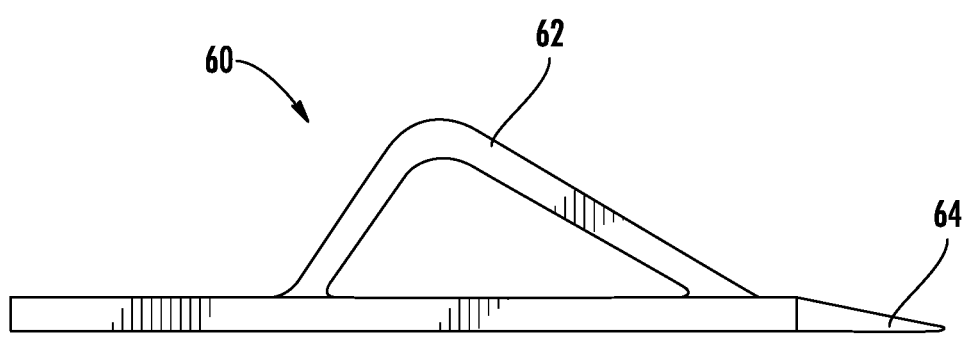
FIG. 8 is a side view of the stay tab of FIG. 7 in accordance with one embodiment of the invention.

FIG. 8 is a side view of the stay tab of FIG. 7 in accordance with one embodiment of the invention. This view shows that the ribs 62 or springs are asymmetrical so that when the user inserts the stay tab 60 it enters the door well easily and then catches on the underside of the weather stripping 26. The stay tab 60 has sharpened entrance area 64.

A method of protecting a car door the steps of forming a stay tab with a wedge shaped entrance area. Next a protective pad is created having a shape that is similar to the car door. The stay tab is attached to the protective pad. Finally, the stay tab is inserted, with the wedge shaped entrance area first, between a window and a weather strip of the car door. The invention is described as having multiple stay tabs, however in some embodiments it may have a single stay tab.

Thus there has been described a door protection system that has stay tabs that the tabs are not too long as to interfere with the mechanical functions of the door or window. The sharpened or wedge shaped entrance are of the stay tabs makes them easy to insert. The ribs engage a lower lip of the weather stripping and ensure the door protection device does not fall out when the owner lowers and raises the window. The suction cup allows the door protection device to function with car doors that have an interior panel that is not concurrent with the door. Finally, the plurality of tabs allow the pad to be bunched up for shorter doors and spread out for longer doors allowing it to work almost any car door.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A door protection device, comprising:
   a protective pad having an upper edge comprising at least one removable tether strap, the at least one removable tether configured to be affixed to a permanent portion of the interior of the door;
   the protective pad further comprising a plurality of stay tabs affixed along the upper edge and collinear to the at least one removable tether strap, and configured to be inserted between a window and a door weather stripping portion of the door; and
   wherein the plurality of stay tabs each comprises a plurality of collinear asymmetrical ribs.

2. The door protection device of claim 1, wherein the each of the plurality of collinear asymmetrical ribs rib is parallel to the edge of the protection pad that is attached to the plurality of stay tabs.

3. The door protection device of claim 1, wherein the protective pad is a heavy fabric.

4. The door protection device of claim 1, wherein the protective pad comprises a silicone rubber sheet.

5. The door protection device of claim 1, wherein the protective pad comprises a sheet of foamed plastic.

6. The door protection device of claim 1, further comprising a suction cup attached to the tether strap.

7. A method of protecting a car door, comprising the steps of:
   affixing to a permanent portion of the car door via at least one removable tether strap, a protective pad having an upper edge;
   inserting between a window and a door weather stripping portions of the car door a plurality of stay tabs affixed along the upper edge of the protective pad and collinear to the at least one removable tether strap, wherein the stay tabs comprise a plurality of collinear asymmetrical ribs inserted facing the door weather stripping portion; and
   the protective pad having a shape that is similar to the car door.

8. The method of claim 7, wherein the at least one removable tether strap is affixed via a suction cup.

\* \* \* \* \*